Nov. 28, 1961 F. GAUCHARD 3,010,910
METHOD FOR PRODUCING TRUE AEROSOLS CARRYING MIST
OF PARTICLES OF MICROSCOPIC STRUCTURE
Filed April 18, 1957 4 Sheets-Sheet 1

Fig. 1

Nov. 28, 1961  F. GAUCHARD  3,010,910
METHOD FOR PRODUCING TRUE AEROSOLS CARRYING MIST
OF PARTICLES OF MICROSCOPIC STRUCTURE
Filed April 18, 1957  4 Sheets-Sheet 2

United States Patent Office 3,010,910
Patented Nov. 28, 1961

3,010,910
METHOD FOR PRODUCING TRUE AEROSOLS CARRYING MIST OF PARTICLES OF MICROSCOPIC STRUCTURE
Fernand Gauchard, Santeny, France
Filed Apr. 18, 1957, Ser. No. 653,623
1 Claim. (Cl. 252—305)

The present invention is a continuation in part of my co-pending specification Ser. No. 241,367, filed on August 10, 1951, now abandoned.

Various methods and means are already known for the production of aerosols comprising non-wetting mists, the particles of which have diameters ranging between 1 and 5 microns; such aerosols will be hereinafter called "true aerosols" to distinguish them from those wetting mists with larger particles which are sometimes inaccurately called "aerosols."

Said methods and means have found numerous applications for therapeutic and hygienic purposes and also for air-conditioning, destruction of pests and the like. However, in the case of certain applications, the use of aerosols exclusively does not yield the desired results or at least does not yield optimum results.

Thus, in the case of numerous therapeutic applications such as in particular the treatment of diseases of the upper respiratory tracts, it is necessary to act both on the surface of the mucous membranes by means of wetting mists, assuming a microscopic structure in accordance with the so-called wet procedure, and on the more remote surfaces of the recesses of the body such as the sinuses into which practically only aerosols are capable of entering. The same is the case in treating different diseases of the large bronchi, of the trachea, and of the larynx, or in the application of sulfurous water, mineral water and antibiotics and the like.

When it is desired to flocculate and precipitate particles that are held in suspension in air, or material of a microbian, chemical or mineral character, it is also necessary to resort on the one hand to the use of a wetting mist the large particles of which provide a rapid drop in percentage of the suspended material and on the other hand to an aerosol that has for its action a braking of the sinking movement of the large particles and a constant increase of the duration of contact thereof with the air while the aerosol acts on the small suspensions of a similar magnitude that are neither contacted nor transformed by the wetting microscopic mists.

Similarly, in the case of horticulture and arboriculture, it is desirable to combine a wetting phase or a phase containing solid particles acting through the surface with an aerosol adapted to act depthwise. This is the case also for the application of aerosols when it is desired to act with a wetting and with a non-wetting phase as also for the flocculation and combination of chemical substances in two phases that are capable, if required, of producing a useful interreaction.

An object of my invention is to provide methods of and means for forming a gasiform stream laden with both true aerosols and microscopic particles.

To this end, my invention includes a method of suspending in a gasiform stream, substances assuming the shape of a true aerosol and also of microscopic particles. Said method consists, more specifically, in atomizing a liquid to be suspended in the shape of a true aerosol by means of a stream of gasiform fluid under pressure after which the gasiform stream is filtered in a conventional aerosol filter and the gasiform stream under pressure laden with true aerosols serves for atomizing a liquid stream or a stream of microscopic particles.

My invention has also for an object the provision of an apparatus for the execution of the above method, said apparatus including a generator of a stream of gasiform fluid under pressure, at least one atomizer fed with at least a portion of said gasiform stream and with a liquid to be suspended in the shape of an aerosol, at least a second atomizer, pipes feeding said second atomizer with the gasiform stream that has already been used in the first atomizer, an aerosol filter located in the path of said gasiform stream between the first and the second atomizer and means for feeding said second atomizer with the substance that is to be suspended in the shape of microscopic particles.

In a first embodiment and when the aerosol and microscopic mist are both produced starting from the same product, the apparatus comprises a closed chamber the bottom of which is filled with the liquid to be suspended, in association with an atomizer fed by a pipe dipping into the mass of liquid under pressure, while a pipe starting from the upper end of the closed chamber leads to an atomizer directed outwardly, the pipe feeding the last mentioned atomizer with liquid also dipping into the mass of liquid, and an aerosol filter occupying the whole breadth of the chamber between the first atomizer and the entrance of the gas-feeding pipe leading to the second atomizer.

In a second embodiment corresponding to the use of different basic materials for the formation of the aerosols and of the microscopic mist or microscopic particles, the apparatus comprises a first closed chamber the bottom of which contains the liquid adapted to form the aerosols, an atomizer connected with a pipe feeding the liquid and dipping into the liquid mass and a pipe feeding the gas under pressure, a pipe starting from the upper part of the closed chamber, an aeorsol filter in said first chamber between the atomizer and the starting point of the above-mentioned pipe, a second chamber containing the product to be suspended in the shape of microscopic particles, a second atomizer fed with gas under pressure through the pipe starting from the upper end of the first chamber, said atomizer dispersing microscopic particles of the liquid or solid product contained in the second chamber.

When it is desired to obtain a stream of gasiform material laden with aerosols of various compositions and with a suspension of microscopic particles, there is inserted in series in the pipe feeding compressed gas to the atomizing device, at least one generator of true aerosols.

When it is desired to obtain a gasiform stream laden with one or more aerosols and with microscopic particles of various compositions, there is used an apparatus including a plurality of closed chambers containing each a basic substance adapted to form the microscopic particles and associated with an atomizer, fed by a fraction of the gasiform stream laden with true aerols while the atomizing nozzles are located in the same gasiform output stream of gas.

I will now disclose by way of example various embodiments of an apparatus according to my invention, reference being made to accompanying drawings, wherein:

FIG. 1 is a vertical sectional view of a conventional apparatus as modified for the production of true aerosols carrying a microscopic mist of the same composition as the aerosol used;

FIG. 2 is an enlarged cross-sectional view of a detail of the apparatus of FIG. 1;

FIG. 3 is an enlarged sectional view on line III—III of FIG. 2 in the direction of the arrows;

FIG. 4 is a diagrammatic elevational view, partly in section, of a modified apparatus for the production of true aerosols carrying micro-mists of different compositions or different from the aerosol used;

FIG. 5 is a sectional view of a modified form of small apparatus adapted for the injection of medicine;

FIG. 6 is a cross-sectional view on line VI—VI of FIG. 5 in the direction of the arrows;

FIG. 7 is a diagrammatic view of another form of apparatus for producing true aerosols alone or a true aerosol or aerosols laden with a micro-mist or a microscopic pulverulent substance.

Turning to FIG. 1, the apparatus is of a conventional type adapted to produce aerosols, as modified for the production of the desired micro-mist in suspension in the aerosol atmosphere.

Said apparatus includes a vessel 1 into the bottom 2 of which leads a pipe 3 for admitting compressed air axially into said vessel from a source of compressed air, e.g., an electric fan, or a bottle of compressed gas as disclosed in my U.S. Patent No. 2,625,156. Said pipe 3 includes an extension forming a central vertical passage 4, the upper end or head 5 of which is provided with lateral nozzles 6 opening adjacent the upper end of small tubes 7 the lower ends of which dip inside the vessel into the mass 8 of liquid that is to be atomized. Around the head of the passage 4 is provided a dished part 9 surrounded by a bell-shaped member 10 acting as a baffle.

The dish 9 is provided with a central opening 9' for the return into the vessel at 8 of the portion of liquid that has not been transformed into an aerosol. The level of the liquid 8 is held constant by means of the liquid feed pipe 11 cooperating with a constant-level vat that is not illustrated.

Inside the vessel and above the atomizing nozzle 6 adapted to form the aerosols is located a series of filters 12 formed of perforated plates the perforations of which are in staggered formation as disclosed in my U.S. Patent No. 2,600,503, or any other type of aerosol filters, e.g., those described in my U.S. Patent No. 2,785,768, granted March 19, 1957, the purpose of said filters being to break up large particles and to separate the larger particles so that all the particles in the emergent stream are within the range of aerosol particles. Said filters may be all conventional filters for the production of aerosols. The vessel 1 forms at its upper end a stack in which may be provided additional filters such as 13, e.g., formed of perforated plates said filters retaining the larger particles which may remain in the stream. Inside said stack and telescoping therewith may slide the cylindrical lower open end of a bell-shaped member 14 the upper end of which is provided with an opening and a connection 15 communicating, if desired, with another pipe connection, not illustrated. The bell-shaped member 14 is urged upwardly within the stack S by a spring 16, its travel being limited by a stop system 17, and it is provided furthermore in its wall with openings 18.

When the bell-shaped member 14 is raised, the aerosols produced by the passage of the liquid jets directed from the nozzles 6 impinge against the wall of the dish 9 and the bell-shaped member 10 and rise through the filters 12 and 13 so as to be exhausted into the atmosphere through the openings 18. When it is desired to use the aerosols in a predetermined location, say with a view to inhalation, the bell-shaped member 14 is depressed and is held in its depressed position by means of a handle 19 adapted to engage the upper surface of a stud 20 provided on the connection 15 whereby the aerosols are allowed to pass through the upper opening and the connection 15 into the pipe forming an extension of the latter and that may be directed towards the patient. When so used the apparatus is a conventional aerosol generator.

The apparatus thus described has been modified for carrying out the invention through the incorporation of a dipper tube 21 the lower end of which dips into the mass of liquid 8 adapted to form the aerosols. The upper end of the tube 21 engages a male connection 24 secured to the wall of the vessel 1 above the filter 12 through a connecting element 22 having a lower flange bearing against the wall of said vessel. Into this connecting element 22 is screwed the actual male connection 24 the end of which assumes the shape of a conical point and through which the end of the tube 21 is adapted to pass.

At the periphery of the male connection 24 are provided recesses 23 (FIG. 3); inside the connecting element 22 is also screwed a female connection including a tube 25 provided at the end facing the male connection with a conical recess fitting exactly the conical tip of the male connection. Said male connection 24 includes a central tube ending with an olive-shaped connection for the small diameter tube 25 while a lateral casing 26 is screwed over the connecting element 22 and is provided round the male connection tube 24 with notches 27 registering with the notches 23 of the male connection. The peripheral casing 26 ends with an olive-shaped part for connection with a yielding tube 28 of a larger diameter surrounding coaxially the above-mentioned small diameter pipe 25.

Figure 4:
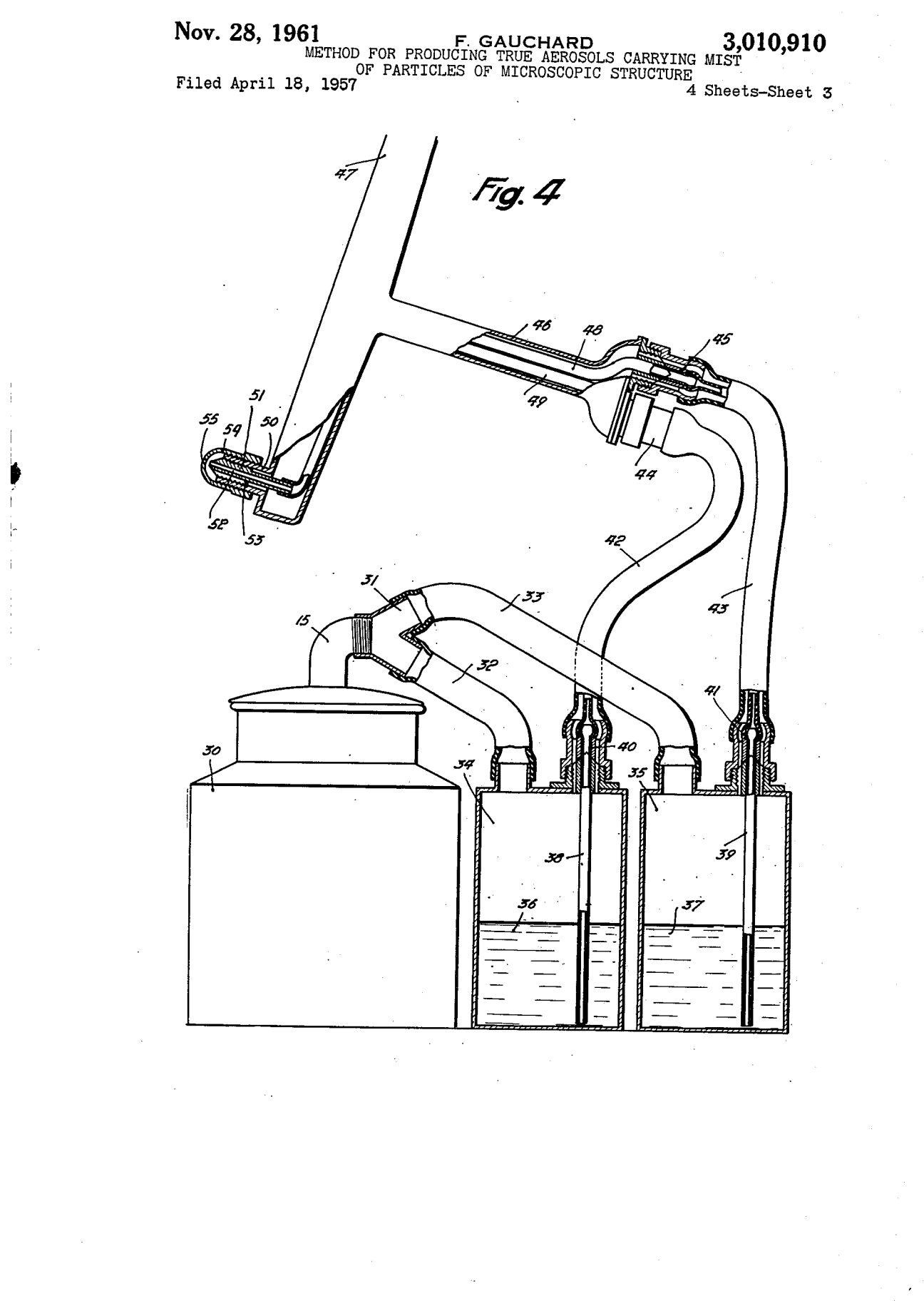

It is thus apparent that the dipper tube 21 is provided with an extension constituted by the central or inner tubes 24—25 while the annular channel inside the outer tube 28 communicates in the part that is left free between it and the inner tube 25 with the inside of the vessel above the filters 12, i.e. with a portion of the vessel containing the true aerosol. The outer end of the coaxial tubes 25 and 28 carries an atomizing nozzle carried by an atomizing implement similar to that which will be described hereinafter with reference to FIG. 4. Said atomizing nozzle is adapted to produce under the action of the stream of compressed gas pressure inside the vessel through the annular channel thus described. Said pressure is transmitted through the free surface of the liquid 8 and causes the latter to rise in the tube 21 which delivers said liquid into the tube 25 up to the atomizing nozzle wherein the liquid is atomized by the jet of gas laden with an aerosol.

In FIG. 4, I have illustrated an arrangement for the production of a gasiform medium containing in suspension a true aerosol and two micro-mists of a different composition. Said arrangement comprises a vessel 30 similar to that described with reference to FIG. 1 hereinabove. The upper connection 15 opens in the present case into a bifurcated connection 31 and the gasiform medium laden with the aerosol is directed through the two corresponding pipes 32 and 33 towards the corresponding glass chambers 34 and 35. Each of said chambers contains a liquid 36 or 37 to be dispersed into the shape of a micro-mist. Inside said chambers dip tubes 38 and 39 ending with composite connections 40 and 41 of the tube already described with reference to the tube 21 of FIGS. 1, 2 and 3. These compound connections 40 and 41 serve for connecting respectively two coaxial tubes 42 and 43 similar to the tubes 25-28 described hereinabove.

The outer ends of the coaxial pipes 42 and 43 open into compound connections 44 and 45 similar to the connections 40 and 41. The outer pipes form the pipes feeding the gasiform current laden with aerosols and are connected through said connections 44 and 45 with the inside of a hollow implement 46 opening into a hollow distributor 47. Inside the implement 46 and the distributor 47 are laid two pipes 48 and 49 connected through the connections 44 and 45 with the yielding pipes of smaller diameter formed by the inner pipes of the coaxial pipes 42 and 43. To the distributor 47 are secured atomizing nozzles constituted by a cylindrical part 50 rigid with the distributor. Inside each cylindrical part 50 is fitted an atomizer nozzle 51, provided with an inner channel 52 communicating with either of the pipes 48 or 49, the connections between any two adjacent atomizing nozzles being provided in alternation with the pipe 48 and with the pipe 49. Round the channel 52, the atomizer nozzle 51 is provided with passageways 53 opening into the inside of the distributor 47. The socket or cylindrical part 50 is outwardly threaded for engagement with a sleeve 54 closed at its end except for an axial perforation 55 registering with the opening of the channel 52.

The gasiform stream laden with aerosols as produced inside the bell-shaped member 14 on the vessel 30 produces a pressure inside the chambers 34 and 35 above the liquid masses 36 and 37 therein and urges consequently the liquid through the pipes 38 and 39 and through the inner pipe of the yielding coaxial pipes 42 and 43 into the pipes 48 and 49 through which said liquid is fed to the atomizing nozzles. The gasiform stream laden with aerosols passes through the annular outer channel in pipes 42 and 43, enters the implement 46 and the distributor 47 and escapes through the passageways and the perforations 55 so as to atomize the liquid stream admitted as described to the atomizing nozzles. The gasiform stream laden with a micro-mist thus constituted in front of the atomizing nozzles mix with one another and produce a gasiform stream laden with aerosols and micro-mists.

FIG. 5 illustrates an apparatus adapted more particularly for the introduction of a mixture of a true aerosol and of a liquid micro-mist of same composition into the upper respiratory tracts. Said apparatus includes a contianer 56 which carries the liquid 57 that is to form the aerosol and that is to be atomized. Over the container 56 is screwed a head 58 carrying on one side a piping 59 adapted to be connected with a supply of compressed air such as from a compressor C (represented by a circle) or a hand-operated deformable bulb. This piping 59 is provided with a tubular extension or pipe 60 which is bent so that its inner end may be horizontal and opens at right angles to the upper end of the pipe 61, the lower end of which dips into the liquid 57. The head 58 also carries a connection 62 terminating with an atomizing head including a hollow olive-shaped part 63 provided with a terminal perforation at 64. Inside said olive-shaped part is secured a nozzle provided with a central pipe 65 surrounded by a plurality of passageways 66 (FIG. 6). Said passageways 66 open into an annular channel formed inside the connection 62 and opening in its turn into the central hollow portion of the head 58. The pipe 65 is provided with a downwardly bent part the lower end of which dips into the bottom of the container 56. Over the pipes 60 and 65 are mounted filters 67 formed of perforated plates, the perforations of which are in staggered formation as disclosed in my U.S. Patent No. 2,600,503 or filters of any other type conventional for the production of aerosols, carried inside the neck of the container and that prevent any direct passage of the gasiform stream between the container and the atomizing head which latter opens in its upper part into a connection 68.

When compressed air is sent through the pipe 60, the stream of compressed air sucks the liquid through the pipe 61 and projects a liquid stream against the wall of the container where said stream is broken up. Part of the liquid sinks in droplet-shape while the remainder forms a true aerosol carried along by the gaseous stream into the head.

The gaseous stream laden with true aerosols may be used for injections by feeding it through the connection 68. If the latter is closed, there arises in the upper part of the container and inside its head a certain pressure that urges the liquid 57 out through the pipe 65. The gasiform stream laden with a true aerosol escapes through the connection 62 and the passageways 66 and atomizes at the end of the nozzle the inner liquid stream, whereby the olive-shaped member 63 delivers a gasiform stream laden with true aerosols and carrying a micro-mist.

Figure 7:
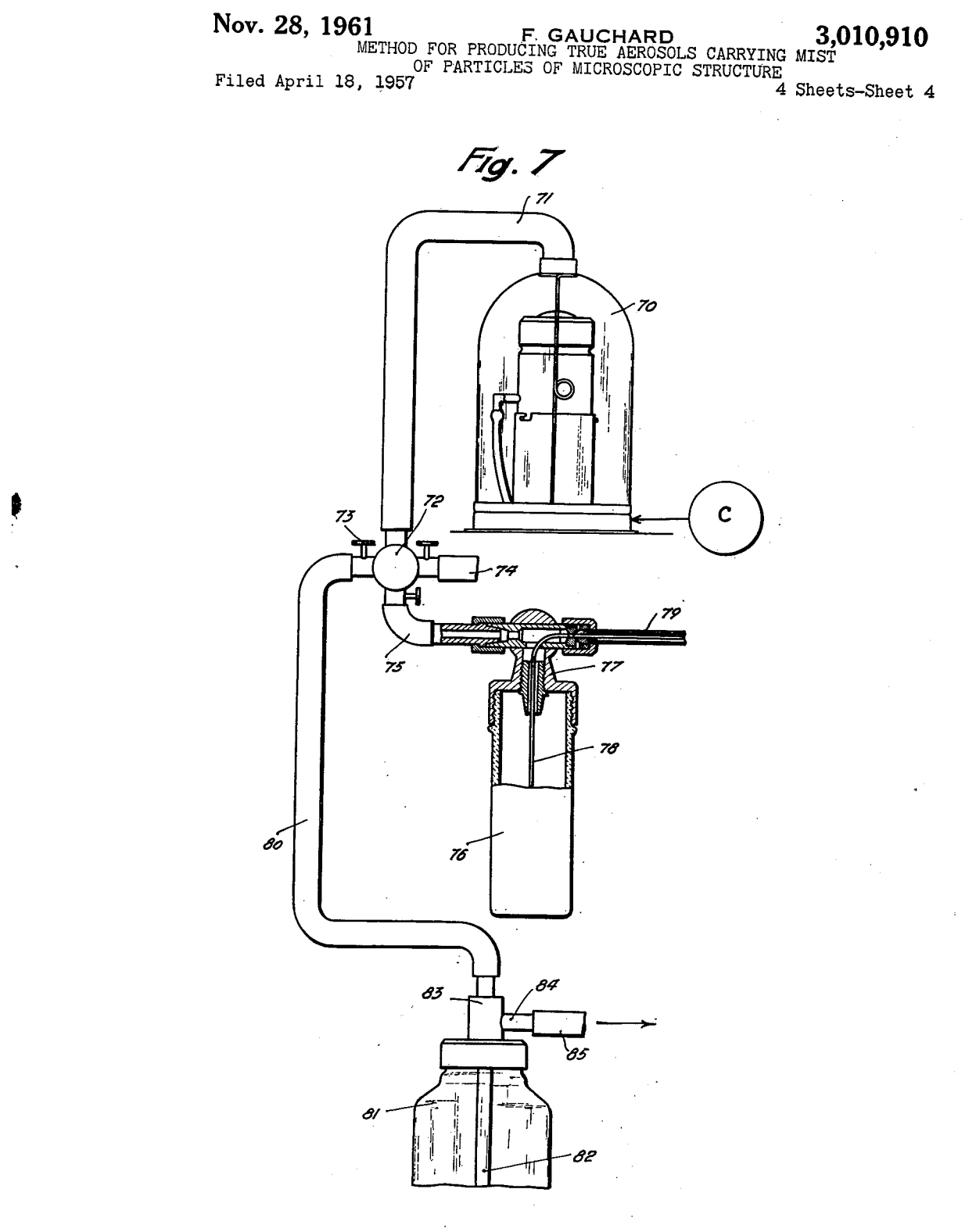

The apparatus illustrated in FIG. 7 is intended for medical purposes in order to apply selectively true aerosols either singly or laden with a micro-mist or again with a dispersion of microscopic pulverulent material. The generator of aerosols of the type disclosed in my above-mentioned U.S. Patent No. 2,625,156 is illustrated diagrammatically by its upper bell-shaped member 70. The aerosols are urged out of said bell-shaped member through the pipe 71. Said pipe ends with a four-way connection 72 of which the three output ways are controlled by valves 73. One of said output ways is connected to a pipe 74 adapted to apply pure aerosols to a patient. A further output way is connected through the connection 75 with the input of compressed gas fed to an atomizer 76 adapted to produce a micro-mist. Said atomizer producing a micro-mist comprises a glass container on which is screwed a head 77 including an inner recess into which compressed gas is admitted, said inner recess communicating with the inside of the container 76 and with a compound connection similar to the above described connection feeding coaxial pipes. The central pipe of this coaxial pipe is connected with a pipe 78 the inner end of which dips into the liquid inside the container 76, while the annular outer tube of the compound connection is secured to a probe 79 forming a coaxial rigid pipe.

The third way fed from the connection 72 opens into a flexible pipe 80 connected with an apparatus for producing a suspension of powder. Said apparatus includes a container 81 along the axis of which is provided a pipe 82 dipping into the container and connected with the flexible pipe 80. The container 81 is capped by an annular head 83 provided with a lateral output pipe 84 connected with a flexible pipe 85; said apparatus operates as follows:

It is possible by closing the cocks 73 controlling the pipes 75 and 80 to direct the stream of true aerosols towards the pipe 74 and thence towards a conventional apparatus for applying the mixture. By closing the cocks controlling the pipes 74 and 80 while opening the cock on the pipe 75, the stream of true aerosols produces an overpressure inside the container 76 and the liquid inside said container 76 rises through the pipe 78 and enters the central pipe of the probe 79. The stream of true aerosols passing through the peripheral annular portion of the coaxial connection enters the outer annular part of the probe and atomizes at the operative end of the latter the liquid stream through an atomizing means of the type described with reference to FIG. 4. There is thus obtained at the end of the probing means a stream laden with true aerosols carrying also a mist of microscopic particles.

If now the cocks 73 are closed on the pipes 74 and 75 while that controlling the pipe 80 is open, the gasiform stream laden with true aerosols enters the pipe 82 and blows onto the mass of pulverulent material inside the container 81 so as to carry as a suspension last-mentioned powder and the compound stream then passes out through the head 83, the connection 84 and the pipe 85 that may be connected with any device for applying the mixture.

The novel arrangement for the application of liquid or solid subdivided material in a gasiform stream laden with true aerosols and with a microscopic wetting mist and/or a cloud of solid particles shows novel and interesting properties. It has been found, for instance, that a conventional atomized liquid solution of a salt of boron flocculates at the end of 7 or 8 minutes. In contra-distinction, the same solution atomized by a stream laden with aerosols remains in suspension in the atmosphere for 35 to 40 minutes. It is thus apparent that my improved method is of considerable interest for increasing the life of a suspension of a micro-mist of any type whatever, inside a gasiform atmosphere.

By way of examples of application of my method, I may mention in the medical field the treatment of tuberculosis through the so-called P.A.S., i.e. paraaminosalicylic acid, streptomycin and isoniazide.

It is found that antibiotics such as paraaminosalicyclic acid and streptomycin are far more efficient in the treatment of tuberculosis when they are introduced into the respiratory tract, but it is essential to administer them so as to reach the entirety of the compound network formed by the bronchia, the bronchioles and the alveolary recesses or sacs. To reach this result in conformity with my improved method, I may resort for instance to the apparatus described in FIG. 1 or 5, wherein the paraaminosalicyclic acid, a solution of its calcium or sodium salts or streptomycin diluted with distilled water forms the liquid mass shown at 8 or 57. The ports for the direct outlet of the aerosols, i.e. the openings 18 and the connection 15 of the apparatus of FIG. 1 or in the case of FIG. 5 the cannula 68 are first closed by any convenient means and the compressor or the like generator of compressed air is then started. A portion of the solution of antibiotics is atomized and filtered so as to produce an aerosol while a further portion delivered in the shape of a liquid stream is atomized for instance in the atomizer 63, 66 described with reference to FIG. 5, through the aerosol itself which leads to the production of a compound suspension of aerosols and of a microscopic mist or a micro-mist of paraaminosalicyclic acid or streptomycin.

With such a method, the micro-mist obtained produces a wetting deposit inside the bronchia while the aerosol enters more deeply into the bronchioles and the alveolary recesses or sacs. The results obtained lead to the assumption that the micro-mist enters the bronchia much more deeply than if it were alone, the presence of the aerosol increasing, as has often been found experimentally, the life of the micro-mist as a suspension.

According to a modified embodiment of said method, the compressed gas used is oxygen, which improves still further the result of the treatment.

It has been found from a medical standpoint that the action of paraaminosalicyclic acid was improved by associating it with a simultaneous treatment through isoniazide but it is impossible to proceed with the mixture before use since such a mixture would lead to oxidation. I resort then to an apparatus of the type illustrated in FIG. 7. I prepare in the aerosol generator 70 an aerosol having isoniazide as a base and I introduce the paraaminosalicyclic acid or the streptomycin inside the bottle 76 so as to obtain at the end of the probe or tube 79 a compound suspension of an aerosol containing isoniazide and a micro-mist of paraaminosalicyclic acid. The greater stability of the micro-mist as a suspension obtained through the presence of the aerosol allows the micro-mist to enter deeply into the bronchioles and alveolary tract.

My improved method is also of interest when used for penicillin treatments the effect of which is increased through the simultaneous treatment of the tissues with a vaso-dilator agent. It is thus possible to produce an aerosol having as a base ephedrin dissolved in water and to use said aerosol as an atomizing agent for producing the micro-mist of penicillin. For gynaecological purposes, it is also possible to resort to compound suspensions of an aerosol carrying penicillin or gonenol extract together with a suspension of a sulfonamide in the form of a microscopic powder.

It is also possible in the case of many applications for disinfecting treatments and for the treatment of trees and plants to resort to a compound suspension constituted by an aerosol having as a base a germicidal, insecticidal or oxidizing substance such as a solution of potassium permanganate or a reducing agent such as an alkaline solution or a polysulfide while the associated micro-mist comprises a wetting substance such as for instance a quaternary ammonium compound.

The gas used may, for certain applications comprise nitrogen, carbon monoxide or sulfurous gas, whether alone or in admixture.

In all the cases where microscopic powders are used for treatment, the use of a liquid aerosol and in particular of an aerosol having as a base water, incorporating a wetting agent or otherwise, for the suspension of the microscopic powders provides an improved stability and a longer life for the suspension; the finer particles of the microscopic powders acquire even thereby a power of penetration which is equal to that of the aerosol.

I may lastly mention as industrial applications of my invention, the neutralization of explosive powders in suspension in the atmosphere through the agency of a reducing aerosol such as a liquid polysulfide associated with a wetting micro-mist or else the neutralization of poisonous substances such as yperite through a complex suspension of an aerosol having oxidizing properties, of an absorbent microscopic powder and of a micro-mist which provides for the flocculation of the particles in suspension in the air.

What I claim is:

A method of providing a suspension of microscopic particles in a gas which comprises producing a mist of liquid particles in a stream of gas, separating the larger particles from the stream of gas so as to obtain an aerosol constituted by a suspension in said stream of gas of liquid particles, the diameter of which is under five microns, and producing a mist by dispersing particles of a substance, the average diameter of said particles being above five microns, by means of said aerosol.

References Cited in the file of this patent

UNITED STATES PATENTS

| | | |
|---|---|---|
| 1,128,697 | Levy | Feb. 16, 1915 |
| 1,307,875 | Parker | June 24, 1919 |
| 1,839,193 | Blanchard | Jan. 5, 1932 |
| 2,586,845 | McKinnan | Feb. 26, 1952 |
| 2,605,087 | Dautrebande | July 29, 1952 |
| 2,605,088 | Dautrebande | July 29, 1952 |

FOREIGN PATENTS

| | | |
|---|---|---|
| 296,194 | Germany | Jan. 20, 1917 |